(12) United States Patent
Hou et al.

(10) Patent No.: US 10,902,317 B2
(45) Date of Patent: Jan. 26, 2021

(54) NEURAL NETWORK PROCESSING SYSTEM

(71) Applicant: National Chiao Tung University, Hsinchu (TW)

(72) Inventors: Tuo-Hung Hou, Hsinchu (TW);
Chih-Cheng Chang, Taipei (TW);
Jen-Chieh Liu, Nantou County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 738 days.

(21) Appl. No.: 15/649,340

(22) Filed: Jul. 13, 2017

(65) Prior Publication Data

US 2018/0330236 A1    Nov. 15, 2018

(30) Foreign Application Priority Data

May 11, 2017    (TW) .............................. 106115591 A

(51) Int. Cl.
*G06N 3/08*    (2006.01)
*G06N 7/00*    (2006.01)
*G06N 3/04*    (2006.01)
*G06N 3/063*    (2006.01)

(52) U.S. Cl.
CPC ................ *G06N 3/08* (2013.01); *G06N 3/04* (2013.01); *G06N 3/0635* (2013.01); *G06N 3/084* (2013.01); *G06N 3/088* (2013.01); *G06N 7/005* (2013.01)

(58) Field of Classification Search
CPC .......... G06N 3/08; G06N 3/04; G06N 3/0635; G06N 3/084; G06N 3/088; G06N 7/005; G06N 3/06; G06N 3/063
See application file for complete search history.

(56) References Cited

U.S. PATENT DOCUMENTS

| | | | |
|---|---|---|---|
| 9,111,222 B2 | 8/2015 | Aparin | |
| 9,129,220 B2 | 9/2015 | Aparin et al. | |
| 9,336,870 B1* | 5/2016 | Mickel | G11C 13/0069 |
| 2019/0286969 A1* | 9/2019 | Wang | G06N 3/02 |

OTHER PUBLICATIONS

"Stochastic memristive devices for computing and neuromorphic applications", Siddharth Gaba, Patrick Sheridan, Jiantao Zhou, Shinhyun Choi and Wei Lu, Nanoscale, 2013, 5, 5872 (Year: 2013).*

(Continued)

*Primary Examiner* — Daniel T Pellett
(74) *Attorney, Agent, or Firm* — Muncy, Geissler, Olds & Lowe, P.C.

(57) ABSTRACT

A neural network processing system includes at least one synapse and a neuron circuit. The synapse receives an input signal and has an external weighted value and an internal weighted value, and the internal weighted value has a variation caused by an external stimulus. When the variation of the internal weighted value accumulates to a threshold value, the external weighted value varies and the input signal is multiplied by the external weighted value of the synapse to generate a weighted signal. A neuron circuit is connected with the synapse to receive the weighted signal transmitted by the synapse, and calculates and outputs the weighted signal. The present invention can simultaneously accelerate the prediction and learning functions of the deep learning and realize a hardware neural network with high precision and real-time learning.

9 Claims, 11 Drawing Sheets

(56) References Cited

OTHER PUBLICATIONS

"A compound memristive synapse model for statistical learning through STDP in spiking neural networks", Johannes Bill and Robert Legenstein, Front. Neurosci., Dec. 16, 2014 (Year: 2014).*

Bernhard Nessler et al., "Bayesian Computation Emerges in Generic Cortical Microcircuits through Spike-Timing-Dependent Plasticity", Apr. 25, 2013, PLoS Comput Biol 9(4) (Year: 2013).*

Siddharth Gaba et al., "Stochastic memristive devices for computing and neuromorphic applications", Nanoscale, 2013, 5, 5872-5878 (Year: 2013).*

Johannes Bill et al., "A compound memristive synapse model for statistical learning through STDP in spiking neural networks", Dec. 16, 2014, Frontiers in Neuroscience vol. 8, Article 412 (Year: 2014).*

Shimeng Yu et al., "Scaling-up Resistive Synaptic Arrays for Neuro-inspired Architecture: Challenges and Prospect"; IEDM Tech. Dig. 2015, pp. 451-454.

S. Park et al.,"Neuromorphic Speech Systems using Advanced ReRAM-based Synapse"; IEDM Tech. Dig. 2013, pp. 625-628.

Shimeng Yu et al., "Binary Neural Network with 16Mb RRAM Macro Chip for Classification and Online Training"; IEDM Tech. Dig. 2016, pp. 416-419.

\* cited by examiner

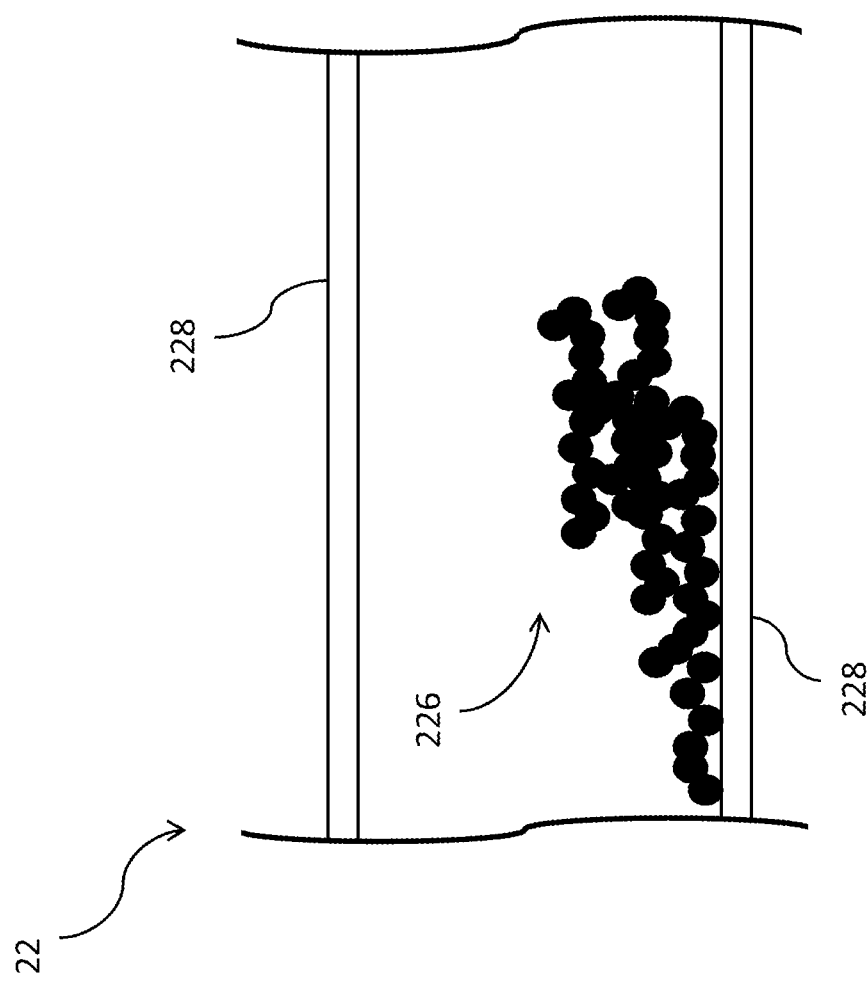

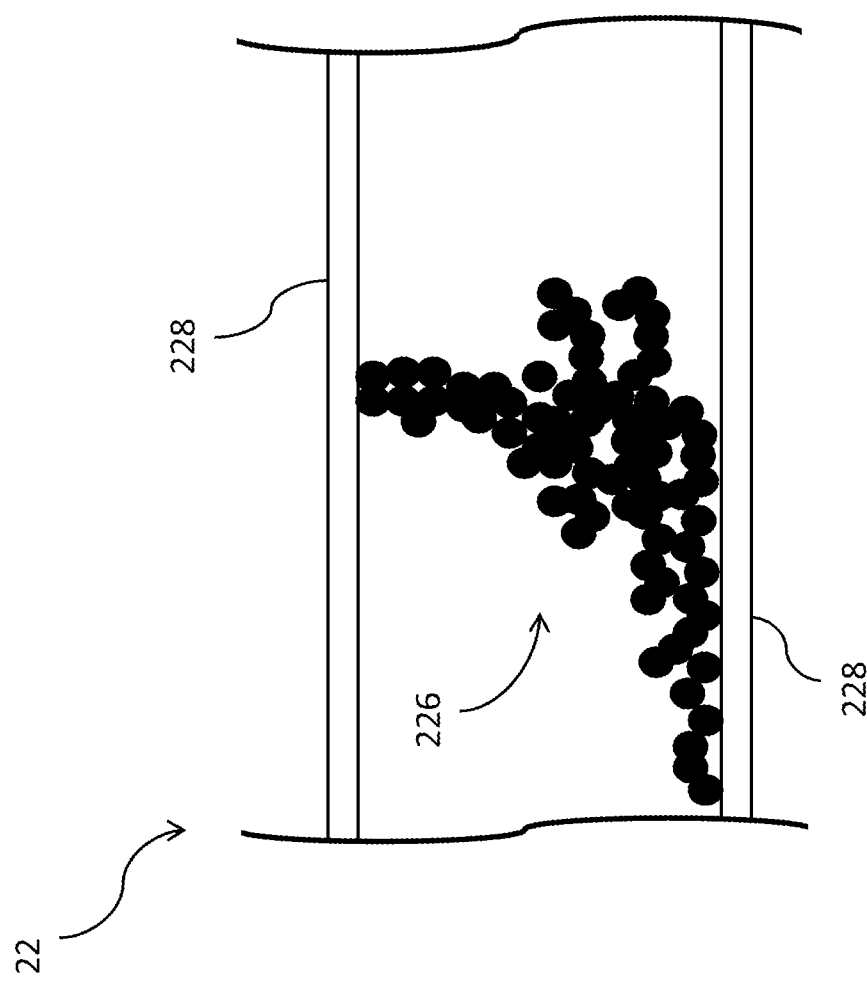

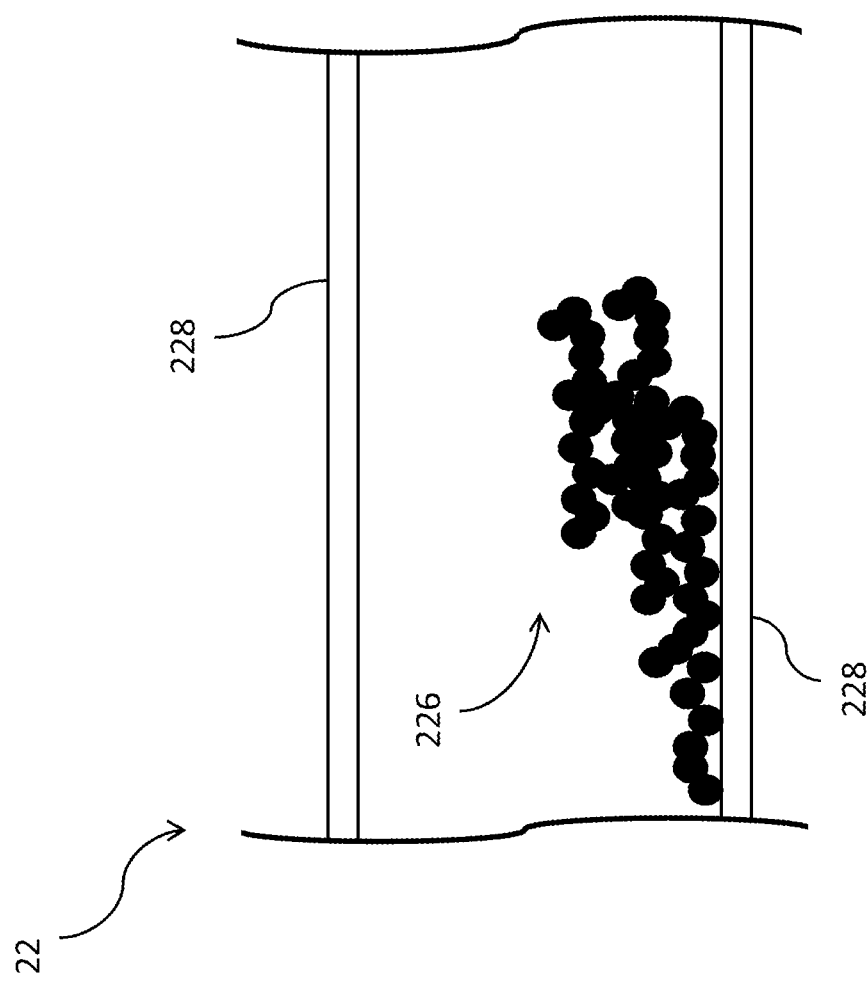

NEURAL NETWORK PROCESSING SYSTEM

This application claims priority for Taiwan patent application no. 106115591 filed on May 11, 2017, the content of which is incorporated by reference in its entirely.

BACKGROUND OF THE INVENTION

Field of the Invention

The present invention relates to an artificial neural network system, particularly to a modified neural network processing system.

Description of the Related Art

With the development of software technology, the deep learning of neural network defined by software uses the general learning rule, so as to greatly improve the ability of artificial intelligence, such as image recognition, speech recognition, natural language understanding and decision. Hardware neural networks (HNN) further reduce the hardware size, cost and power consumption of the deep learning system.

HNN consists of neuron networks connected to each other through synapses and has thousands of synapses, wherein weights of the synapses are optimized during training. Refer to FIG. 1. A neuron 10 receives several input signals 12. During training of synapses 14, a weight 142 is usually initialized by a random value and varied by a slight increment. In general, the weights 142 of the synapses 14 are stored in a multi-bit memory. Analog multi-level properties of a resistive random access memory (RRAM) are used for storing the weights of the synapses. More particularly, a synapse array of a high-density crossbar resistive random access memory stores distributed weights to simultaneously perform multiplication of matrix vectors and update the weights, whereby the learning efficiency is apparently improved.

However, the RRAM has some problems. Firstly, the technology of an analog multi-level RRAM is much less mature than that of a binary RRAM. Secondly, the analog multi-level RRAM needs complicated writing steps. That is to say, the analog multi-level RRAM needs to precisely control amplitudes of pulses and sustained time, which is not an ideal behavior. For example, the finite precision and non-linear update for weights both cause damage to the performance of the HNN. Thirdly, the analog RRAM usually has the worse data-keeping time and reliability.

The simple binary RRAM is used to overcome the drawbacks of the RRAM by two ways. One way is to use several binary RRAM units to represent a single weight. However, the precision of weights increases as network density increases. Thus, the scale of network is limited. Another way is to use a single RRAM to represent a binary weight. In such a case, although the inference capability with high precision is developed after time-consuming offline training, the precision of weights is too low to accelerate online training.

To overcome the abovementioned problems, the present invention provides a neural network processing system for improving binary weight calculations, so as to improve weight calculations of the conventional synapses.

SUMMARY OF THE INVENTION

A primary objective of the present invention is to provide a neural network processing system, which uses an external signal such as an electrical stimulus and the adaptive learning rule to update an external weighted value and an internal weighted value of a synapse, wherein the external weighted value can be measured and the internal weighted value cannot be directly measured. Under continuous external stimuli, the internal weighted value has accumulation properties. When a variation of the internal weighted value accumulates to a threshold value, the external weighted value varies to generate a precise weighted signal.

Another objective of the present invention is to provide a neural network processing system, which uses a synapse having an external weighted value and an internal weighted value to overcome the drawbacks of a conventional single analog weight with low precision. Thus, the demand for updating the precise weight required by on-line learning is satisfied, and the prediction and learning functions of the deep learning are accelerated to realize a hardware neural network for real-time on-line learning.

To achieve the abovementioned objectives, the present invention provides a neural network processing system, which comprises at least one synapse and a neuron circuit. The synapse receives at least one input signal and has an external weighted value and an internal weighted value, and the internal weighted value has a variation caused by an external stimulus. When the variation of the internal weighted value accumulates to a threshold value, the external weighted value varies and the input signal is multiplied by the external weighted value of the synapse to generate at least one weighted signal. The neuron circuit is connected with the synapse to receive the weighted signal transmitted by the synapse, and calculates and outputs the weighted signal.

In an embodiment of the present invention, the external weighted value is obtained by electrical measurement. The electrical measurement is measurement of resistance, capacitance, inductance or impedance.

In an embodiment of the present invention, the internal weighted value is a difference of a physical structure of the synapse, and the difference comprises amounts of defects, compositions of elements, atom arrangement, molecular configurations, ferroelectric domain arrangement or ferromagnetic domain arrangement. The difference of the physical structure uniformly or non-uniformly exists in the synapse.

In an embodiment of the present invention, the variation of the internal weighted value accumulates by the gradient-descent backward propagation rule, the spike-timing-dependent plasticity (STDP), the Hebb rule, the Oja rule or the Bienenstock-Cooper-Munro (BCM) rule.

In an embodiment of the present invention, the external stimulus is a voltage or a current.

In an embodiment of the present invention, the external weighted value has a random variation of binary states, and a cumulative distribution function (CDF) of the internal weighted value is used to determine a probability of the random variation. The CDF of the internal weighted value is adjusted by a pulse amplitude, a pulse duration and a pulse relaxation period for a pulse voltage or a current stimulus.

In an embodiment of the present invention, the synapse comprises a binary resistive random-access memory (RRAM), an oxide RAM, a conductive-bridging RAM (CBRAM), a phase-change memory (PCM), a magnetoresistive RAM (MRAM), a ferroelectric RAM (FERAM), a spin torque transfer MRAM (STT-MRAM) or a parallel and series combination of these. The synapse consists of a plurality of memories, and the external weighted value of the synapse consists of a plurality of bits.

Below, the embodiments are described in detail in cooperation with the drawings to make easily understood the technical contents, characteristics and accomplishments of the present invention.

BRIEF DESCRIPTION OF THE DRAWINGS

FIGS. 5a-5e are diagrams showing the steps for varying an internal weighted value due to amounts of the defects according to the second embodiment of the present invention;

DETAILED DESCRIPTION OF THE INVENTION

The present invention provides a new type of a hardware neural network to accelerate the prediction and learning functions of the deep learning. For example, a synapse of a binary memory is used to generate an external weighted value and an internal weighted value, and the external weighted value and the internal weighted value are updated according to the adaptive learning rule to realize a hardware neural network with high precision and real-time on-line learning.

Figure 1:
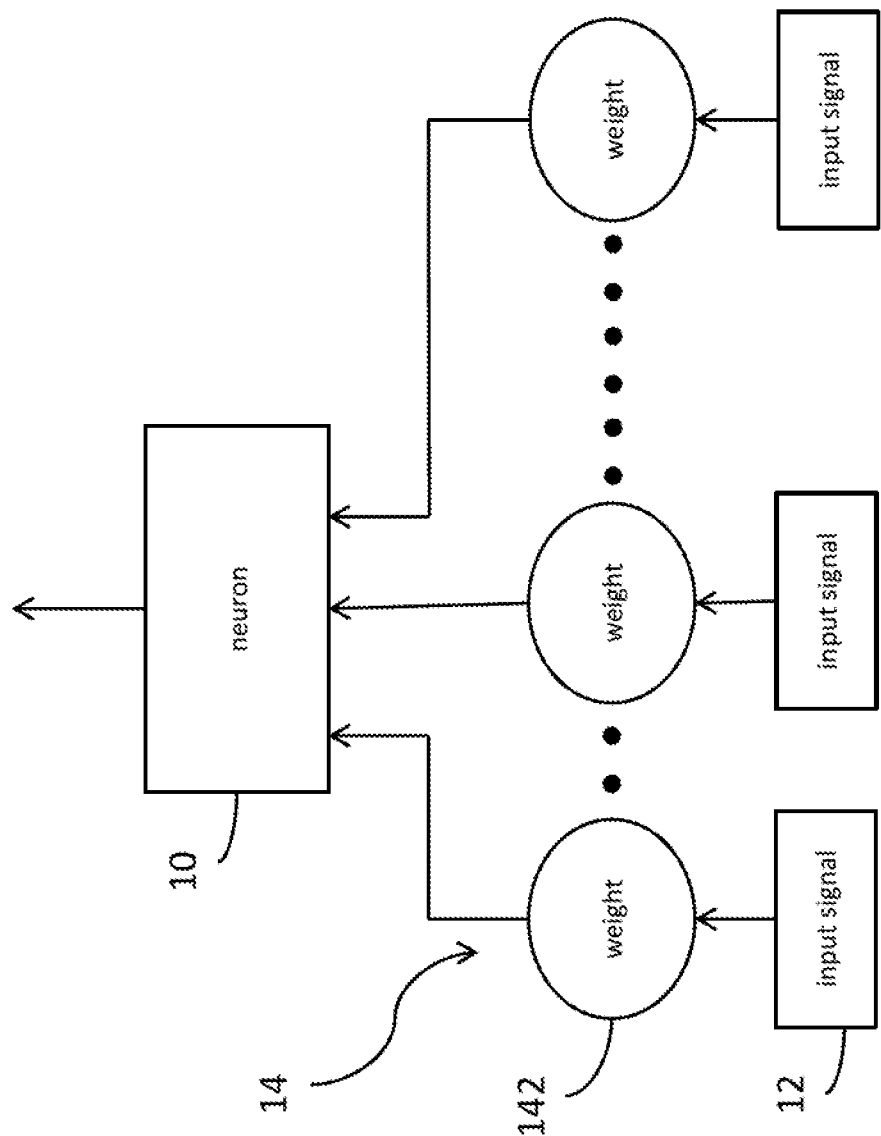
FIG. 1 is a diagram schematically showing a hardware neural network in a conventional technology.
Figure 2:
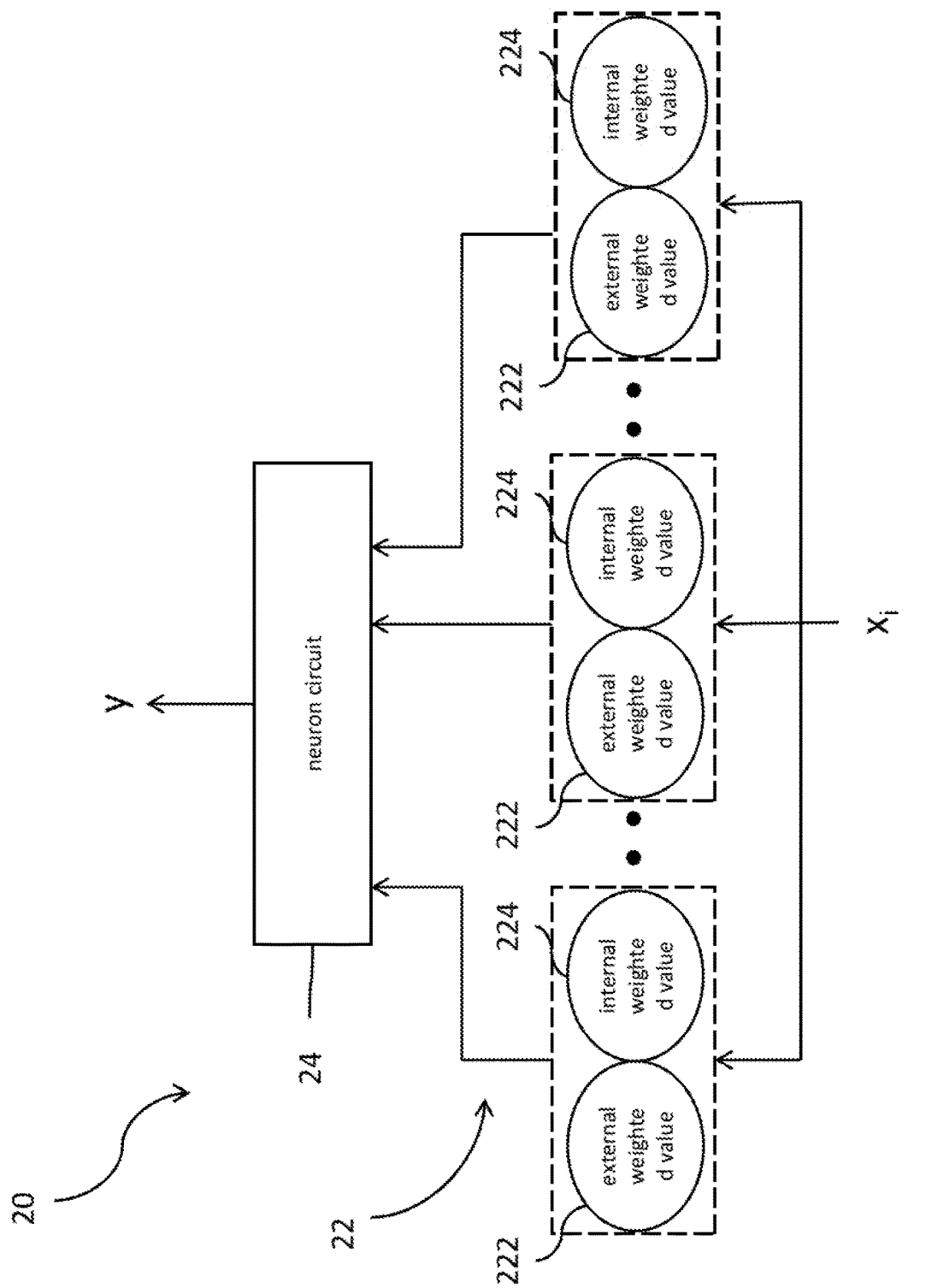
FIG. 2 is a diagram schematically showing a neural network processing system according to an embodiment of the present invention.

Refer to FIG. 2. A neural network processing system 20 comprises at least one synapse 22 and a neuron circuit 24. The neuron circuit 24 is connected with the synapse 22. The synapse 22 comprises a binary resistive random-access memory (RRAM), an oxide RAM, a conductive-bridging RAM (CBRAM), a phase-change memory (PCM), a magnetoresistive RAM (MRAM), a ferroelectric RAM (FE-RAM), a spin torque transfer MRAM (STT-MRAM) or a parallel and series combination of these. In the embodiment, the synapse 22 is a binary resistive random-access memory. The present invention exemplifies a plurality of synapses 22, but the present invention is not so limited thereto. Each synapse 22 receives an input signal $x_i$. The input signals $x_i$ may be identical or different. Each synapse 22 has an external weighted value 222 and an internal weighted value 224. Each synapse 22 generates a weighted signal and transmits it to the neuron circuit 24, so that the neuron circuit 24 generates and outputs an output signal y. In the embodiment, the internal weighted value 224 is a difference of a physical structure of the synapse, and the difference comprises amounts of defects, compositions of elements, atom arrangement, molecular configurations, ferroelectric domain arrangement or ferromagnetic domain arrangement. The difference of the physical structure uniformly or non-uniformly exists in the synapse 22. The external weighted value 222 is obtained by electrical measurement, namely measurement of resistance, capacitance, inductance or impedance. That is to say, the measured value of resistance, capacitance, inductance or impedance can be the external weighted value 222. However, the present invention does not limit the external weighted value 222 and the internal weighted value 224. The external weighted value 222 and the internal weighted value 224 are adjusted according to the requirement for a circuit of a user.

After describing the architecture of the present invention, the operation of the present invention is described. Refer to FIG. 2. Each synapse 22 receives an input signal $x_i$. The internal weighted value 224 of the synapse 22 has the variation caused by an external stimulus. In the embodiment, the external stimulus is a voltage or a current inputted from an exterior of the synapse 22. The external stimulus can change the synapse 22, whereby the internal weighted value 224 of the synapse 22 is varied. The variation of the internal weighted value 224 is accumulative. When the variation of the internal weighted value 224 accumulates to a threshold value, the external weighted value 222 varies. The external weighted value 222 has a random variation of binary states, and a cumulative distribution function (CDF) of the internal weighted value is used to determine a probability of the random variation. Then, the synapse 22 multiplies the input signal $x_i$ by the external weighted value 222 of the synapse 22 to generate a weighted signal. Each synapse 22 transmits its weighted signal to the neuron circuit 24, whereby the neuron circuit 24 outputs the output signal y.

Continuing from the abovementioned description, the variation of the internal weighted value 224 accumulates by the gradient-descent backward propagation rule, the spike-timing-dependent plasticity (STDP), the Hebb rule, the Oja rule or the Bienenstock-Cooper-Munro (BCM) rule.

Figure 3:
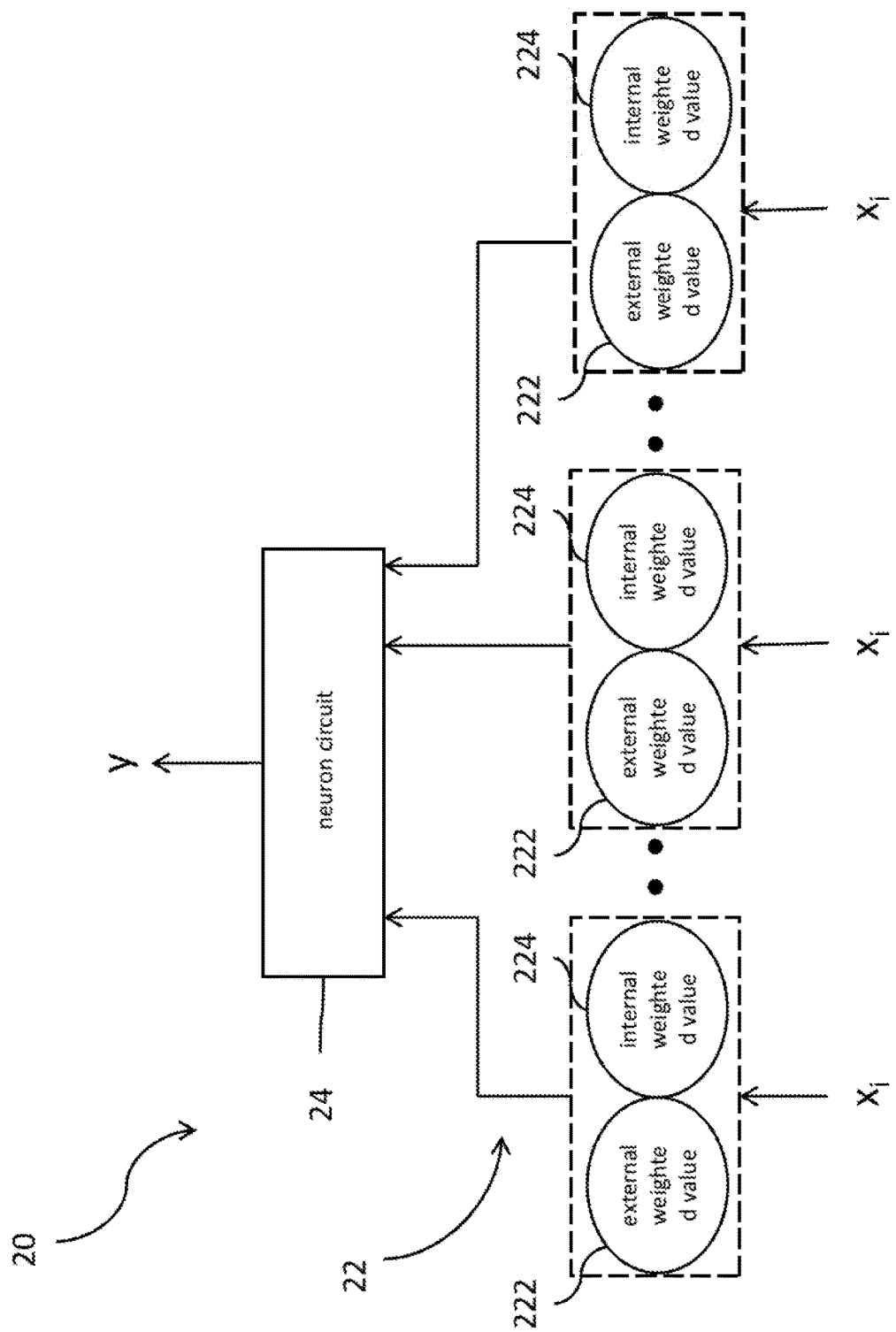
FIG. 3 is a diagram schematically showing a neural network processing system according to another embodiment of the present invention.
Figure 4:
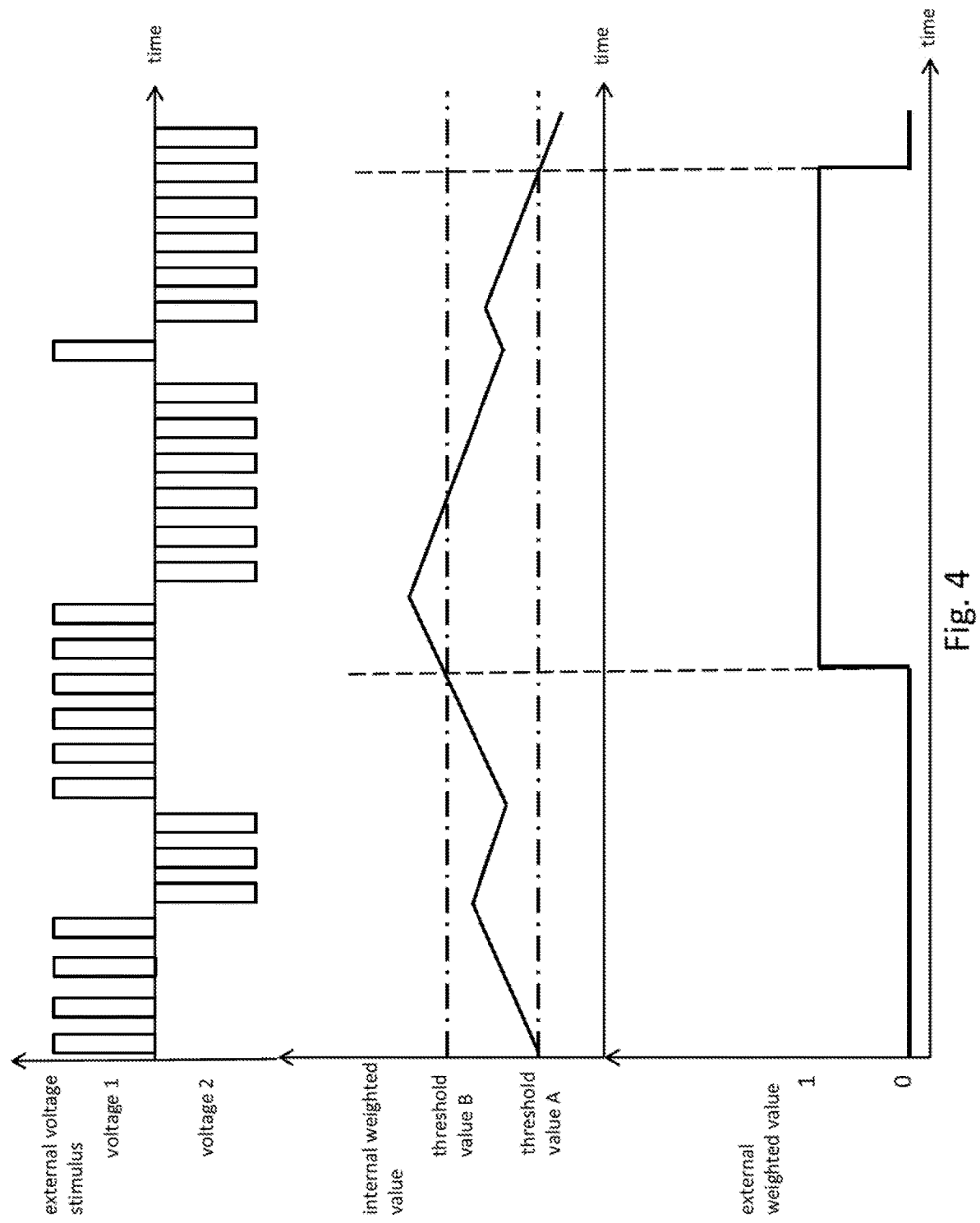
FIG. 4 is a diagram showing a curve for varying an internal weighted value and an external weighted value according to the first embodiment of the present invention.
Figure 5B:
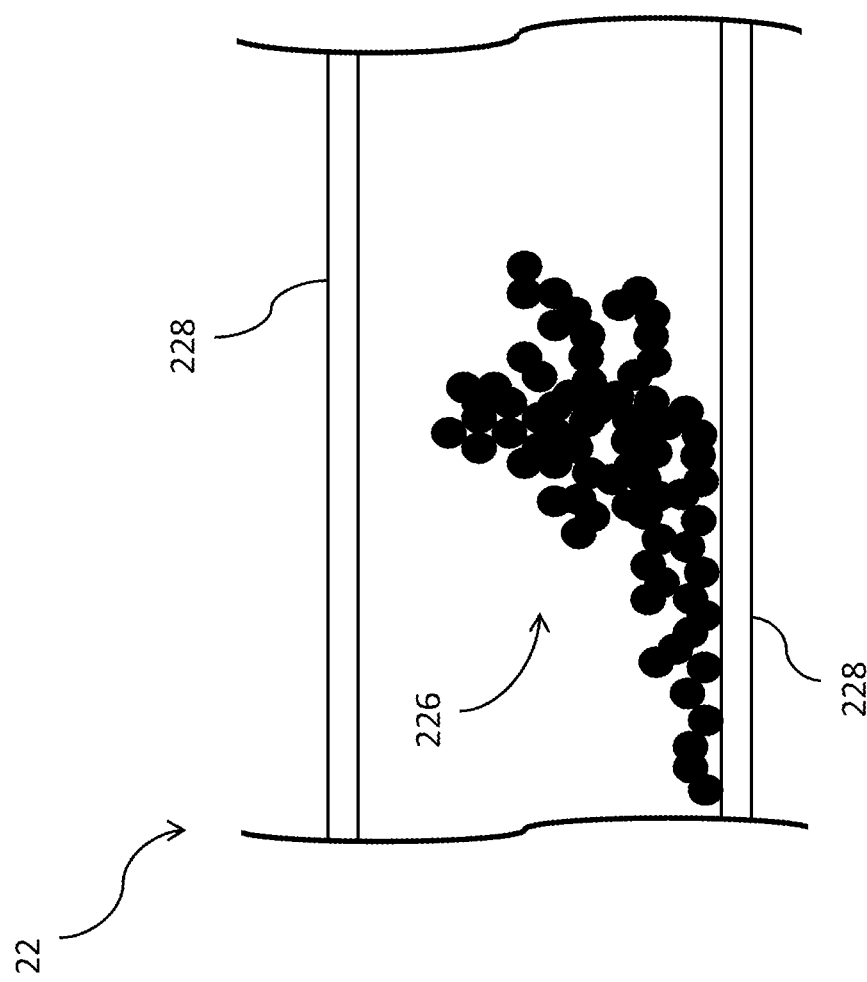
Figure 5C:
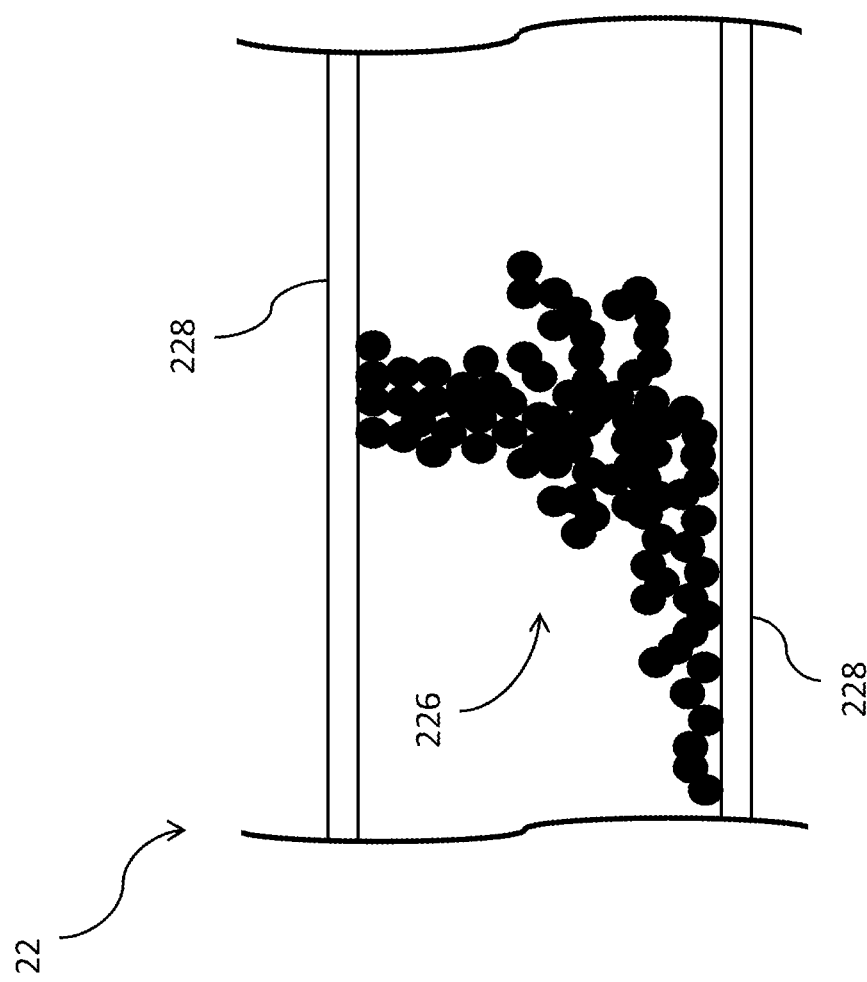

After describing the architecture and the operation of the present invention, an embodiment of the neural network processing system of the present invention is introduced. Refer to FIG. 3 and FIG. 4. In the embodiment, the amounts of the synapses are three. The input signal $x_i$ of each synapse 22 is independent. The user can input a voltage to the synapse 22 as a binary resistive random-access memory, so that the resistance of the synapse 22 reacts to the voltage. Since different external input voltages generate different response results, the internal weighted values 224 of the synapses 22 are varied. For example, an external input voltage 1 can gradually increase the internal weighted value 224, and an external input voltage 2 can gradually decrease the internal weighted value 224. Nevertheless, refer to FIGS. 5a-5e. The variation of the internal weighted value 224 represents the variation of the amounts of defects 226 of the synapse 22. The defect 226 is an atom of a metal group or a vacancy of oxygen. The defects 226 connected to each other form a local current conduction path. In the embodiment, the defect 226 is exemplified by a vacancy of oxygen. As shown in FIG. 5a, initial amounts of the defects 226 reach a threshold value A at two nonconducting positions 228 of the synapse 22. Thus, the positions 228 of the synapse 22 are not conducted. As shown in FIG. 5b, when higher voltage 1 is inputted, more defects 226 of the synapse 22 are generated. As shown in FIG. 5c, when the amounts of the defects 226 are increased to reach a threshold value B such that the defects 226 connect with the positions 228 originally not connected, the positions 228 of the synapse 22 originally not conducted are conducted. Thus, a binary state of the external weighted value 222 is varied from 0 to 1. As shown in FIG. 5d, when the relative higher voltage 2 is inputted, the amounts of the defects 226 are decreased. However, the decrease of the defects 226 cannot change the conduction state of the positions 228 of the synapse 22. As shown in FIG. 5e, when the amounts of the defects 226 are decreased to disconnect the defects 226 from the positions 228 originally connected such that the amounts of the defects 226 reach to below the threshold value A, the binary state of the external weighted value 222 is varied from 1 to 0. Then, each synapse 22 multiplies its external weighted value 222 by the received input signal $x_i$ to generate the weighted signal. Each synapse 22 transmits the weighted signal to the neuron circuit 24 to calculate and output it.

Figure 6:
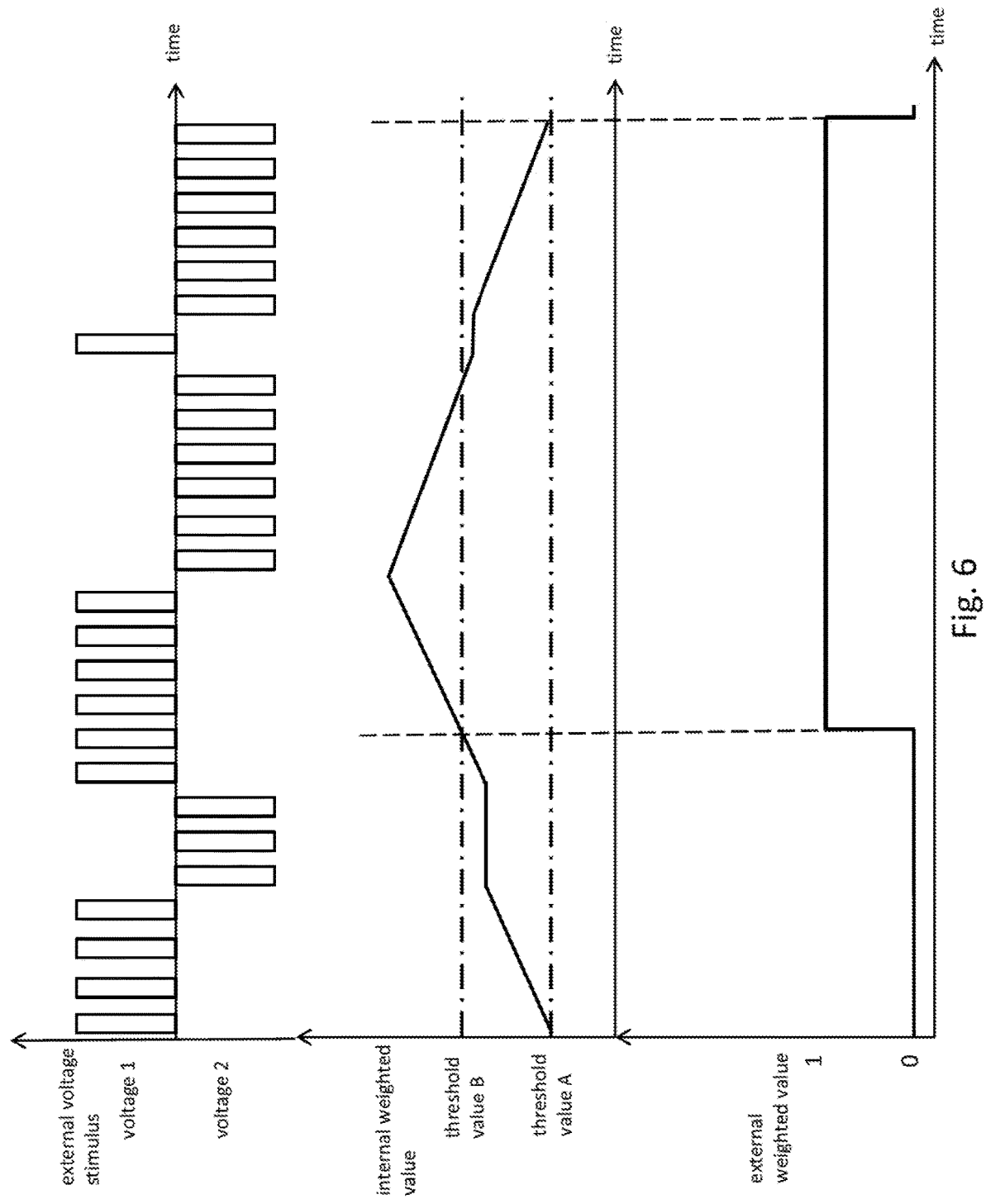
FIG. 6 is a diagram showing a curve for varying an internal weighted value and an external weighted value according to the second embodiment of the present invention.

Refer to FIG. 6. In another embodiment, the internal weighted value of the synapse varies when the external weighted value varies. For example, when the external weighted value is 0, only the external input voltage 1 can gradually increase the internal weighted value. The external input voltage 2 cannot affect the internal weighted value. When the external weighted value is 1, only the external input voltage 2 can gradually decrease the internal weighted value. The external input voltage 1 cannot affect the internal weighted value.

Figure 7:
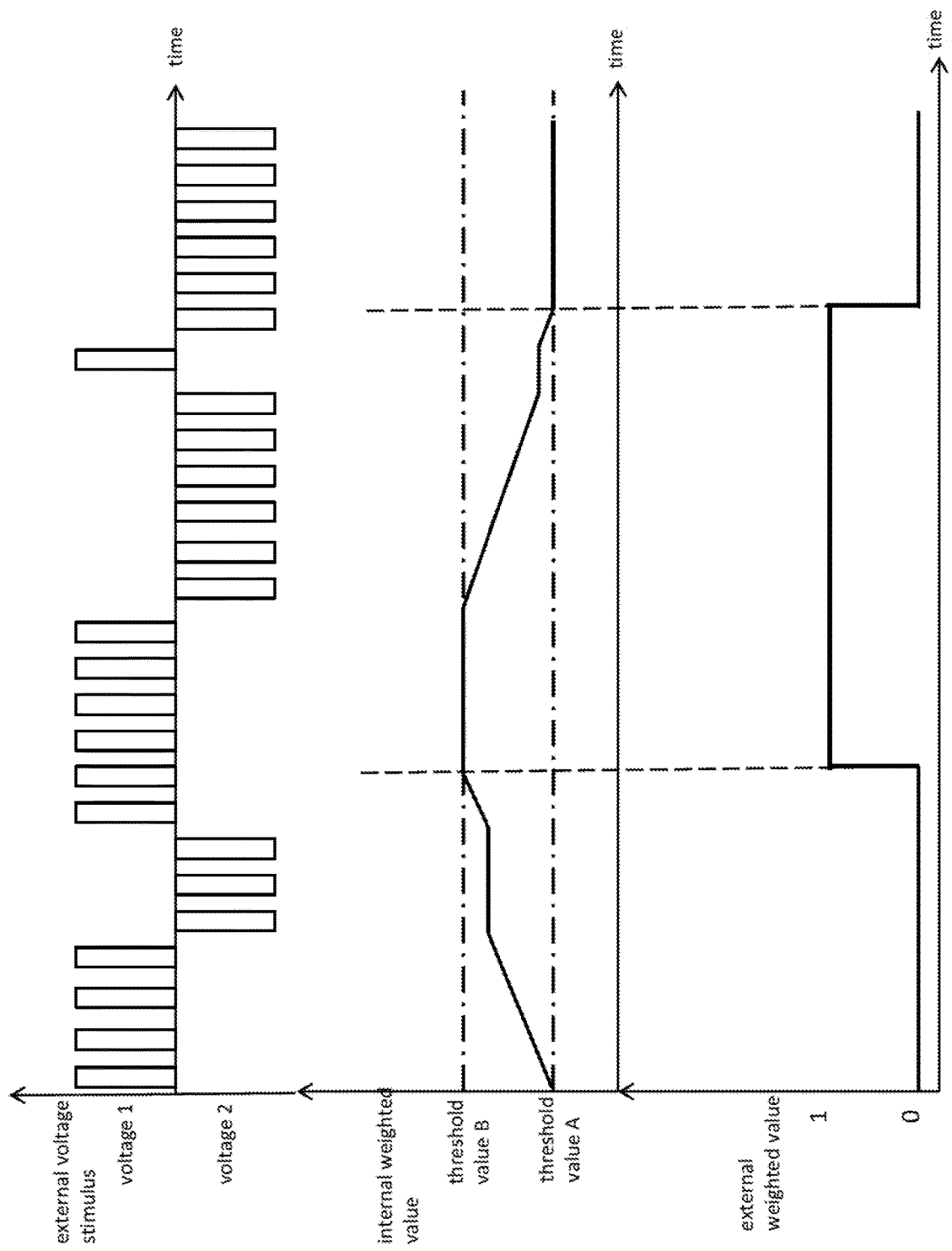
FIG. 7 is a diagram showing a curve for varying an internal weighted value and an external weighted value according to the third embodiment of the present invention.

Refer to FIG. 7. In another embodiment, the variation of the internal weighted value of the synapse is limited between the threshold values A and B. For example, when the external weighted value is 1, the external input voltage 1 cannot continue increasing the internal weighted value. When the external weighted value is 0, the external input voltage 2 cannot continue decreasing the internal weighted value 224.

In the abovementioned embodiments, When the internal weighted value reaches the threshold values A or B, the external weighted value does not necessarily have a variation of binary states. The variation of binary states is random. A cumulative distribution function (CDF) of the internal weighted value is used to determine a probability of the random variation. The CDF of the internal weighted value is adjusted by a pulse amplitude, a pulse duration and a pulse relaxation period for a pulse voltage or a current stimulus.

The present invention uses the gradient-descent backward propagation rule of conventional hardware neural networks (HNN) to update the internal weighted value and update the external weighted value in cooperation with the CDF, thereby establishing new calculation formulas (1)-(7):

$$H_j = f_a(\Sigma_{i=1}^I X_i \times W_{ext,i,j}) = f_a(I_j) \quad (1)$$

$$O_k = f_a(\Sigma_{j=1}^J H_j \times W_{ext,j,k}) = f_a(I_k) \quad (2)$$

$$\delta_k = (T_k - O_k) \times f_a'(I_k) \quad (3)$$

$$\delta_j \Sigma_{k=1}^k (\delta_k \times W_{ext,j,k}) \times f_a'(I_j) \quad (4)$$

$$w_{int,i,j}^{new} = w_{int,i,j}^{old} - \eta \times X_i \times \delta_j \quad (5)$$

$$w_{int,j,k}^{new} = w_{int,j,k}^{old} - \eta \times H_j \times \delta_k \quad (6)$$

$$P_{ext,sw} = [CDF(W_{int}^{new}) - CDF(W_{int}^{old})]/[1 - CDF(W_{int}^{old})] \quad (7)$$

$H_j$ is an output value of a neuron of a $j^{th}$ hidden layer, and $O_k$ is an output value of a neuron of a $k^{th}$ output layer, and $X_i$ is an output value of a $i^{th}$ input layer, and $w_{ext,i,j}$ is the external weighted value between the $i^{th}$ input layer and the neuron of the $j^{th}$ hidden layer, and a $w_{ext,j,k}$ is the external weighted value between the $j^{th}$ hidden layer and a $k^{th}$ output neuron, and $f_a$ is a activation function, and $I_j$ is a sum of weighted products of neurons of the $j^{th}$ hidden layer, and $I_k$ is a sum of weighted products of neurons of the $k^{th}$ output layer, and $T_k$ is a target output value of the $k^{th}$ output layer, and $f_a'$ is a differentiation item of the activation function, and $\delta_k$ is an error amount of the $k^{th}$ output layer, and $\delta_j$ is an error amount of the $j^{th}$ hidden layer, and $w_{int,i,j}$ is the internal weighted value between the $i^{th}$ input layer and the neuron of the $j^{th}$ hidden layer, and $w_{int,j,k}$ is the internal weighted value between the $j^{th}$ hidden layer and the $k^{th}$ output neuron, and $\eta$ is a learning speed, and $w^{old}$ is a weighted value before update, and $w^{new}$ is a weighted value after update, and $P_{ext,sw}$ is a probability of switching the external weighted value, and CDF is the cumulative distribution function determined by the internal weighted value.

The present invention provides several combinations of a neural network processing system to form a new type of a hardware neural network to accelerate the prediction and learning functions of the deep learning. A binary memory is used to represent a single synapse of the neural network processing system. The synapse has an external weighted value and an internal weighted value, such as analog weights, wherein the external weighted value can be measured and the internal weighted value cannot be directly measured. The present invention uses an external signal such as an electrical stimulus and the adaptive learning rule or formula to update the analog weights. Under continuous external stimuli, the update of the analog weights has accumulation properties, whereby the update of the weight values is determined by the internal weighted values such as analog weights.

The present invention does not limit an amount and a form of the synapse. In addition to a binary resistive random-access memory, the synapse can be the other memory or consist of a plurality of memories. When the synapse consists of a plurality of binary memories, the external weight value of the single synapse has multiple bits. The embodiments described above are only to exemplify the present invention but not to limit the scope of the present invention. The present invention uses a synapse having an external weighted value and an internal weighted value to overcome the drawbacks of a conventional single analog weight with low precision, thereby satisfying the demand for updating the precise weight.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A neural network processing system comprising:
at least one synapse receiving at least one input signal and having an external weighted value and an internal weighted value, and said internal weighted value has a variation based on said external weighted value and an external stimulus, and when said variation of said internal weighted value accumulates to a threshold value, said external weighted value varies and said at least one input signal is multiplied by said external weighted value of said at least one synapse to generate at least one weighted signal; and a neuron circuit connected with said at least one synapse to receive said weighted signal transmitted by said at least one synapse, and processing said at least one weighted signal to output a result signal wherein said external weighted value has a random variation of binary states, and a cumulative distribution function (CDF) of said internal weighted value is used to determine a probability of said random variation;

wherein a formula of calculating said internal weighted value to obtain a probability of switching said external weighted value is expressed by $H_j = f_a(\Sigma_{i=1}^I X_i \times W_{ext,i,j}) = f_a(I_j)$, $O_k = f_a(\Sigma_{j=1}^J H_j \times W_{ext,j,k}) = f_a(I_k)$, $\delta_k = (T_k - O_k) \times f_a'(I_k)$, $\delta_j \Sigma_{k=1}^K (\delta_k \times W_{ext,j,k}) \times f_a'(I_j)$, $w_{int,i,j}^{new} = w_{int,i,j}^{old} - \eta \times X_i \times \delta_j$, $w_{int,j,k}^{new} = w_{int,j,k}^{old} - \eta \times H_j \times \delta_k$, and $P_{ext,sw} = [CDF(W_{int}^{new}) - CDF(W_{int}^{old})]/[1 - CDF(W_{int}^{old})]$, wherein $H_j$ is an output value of a neuron of a $j^{th}$ hidden layer, and $O_k$ is an output value of a neuron of a $k^{th}$ output layer, and $X_i$ is an output value of a $i^{th}$ input layer, and $w_{ext,i,j}$ is said external weighted value between said $i^{th}$ input layer and said neuron of said $j^{th}$ hidden layer, $w_{ext,j,k}$ is said external weighted value between saaid $j^{th}$ hidden layer and a $k^{th}$ output neuron, $f_a$ is a activation function, $I_j$ is a sum of weighted products of neurons of said $j^{th}$ hidden layer, $I_k$ is a sum of weighted products of neurons of said $k^{th}$ output layer, $T_k$ is a target output value of said $k^{th}$ output layer, $f_a'$ is a differentiation item of said activation function, $\delta_k$ is an error amount of said $k^{th}$ output layer, $\delta_j$ is an error amount of said $j^{th}$ hidden layer, $w_{int,i,j}$ is said internal weighted value between said $i^{th}$ input layer and said neuron of said $j^{th}$ hidden layer, $w_{int,j,k}$ is said internal weighted value between said $j^{th}$ hidden layer and said $k^{th}$ output neuron, $\eta$ is a learning speed, $w^{old}$ is said internal weighted value before update, $w^{new}$ is said internal weighted value after update, $w_{int,i,j}^{old}$ is said internal weighted value before update between said $i^{th}$ input layer and said neuron of said $j^{th}$ hidden layer, $w_{int,i,j}^{new}$ is said internal weighted value after update between said $i^{th}$ input layer and said neuron of said $j^{th}$ hidden layer, $w_{int,j,k}^{old}$ is said internal weighted value before update between said $j^{th}$ hidden layer and said $kt^h$ output neuron, $w_{int,j,k}^{new}$ is said internal weighted value after update between said $j^{th}$ hidden layer and said $kt^h$ output neuron, $P_{ext,sw}$ is a probability of switching said external weighted value to 1 or 0, and CDF is said cumulative distribution function determined by said internal weighted value.

2. The neural network processing system according to claim 1, wherein said external weighted value is obtained by electrical measurement.

3. The neural network processing system according to claim 2, wherein said electrical measurement is measurement of resistance, capacitance, inductance or impedance.

4. The neural network processing system according to claim 1, wherein said internal weighted value is a difference of a physical structure of said at least one synapse, and said difference comprises amounts of defects, compositions of elements, atom arrangement, molecular configurations, ferroelectric domain arrangement or ferromagnetic domain arrangement.

5. The neural network processing system according to claim 1, wherein said variation of said internal weighted value accumulates by a gradient-descent backward propagation rule, a spike-timing-dependent plasticity (STDP), a Hebb rule, an Oja rule or a Bienenstock-Cooper-Munro (BCM) rule.

6. The neural network processing system according to claim 1, wherein said external stimulus is a voltage or a current.

7. The neural network processing system according to claim 1, wherein said CDF of said internal weighted value is adjusted by a pulse amplitude and a pulse duration for a pulse voltage or a current stimulus.

8. The neural network processing system according to claim 1, wherein said at least one synapse comprises a binary resistive random-access memory (RRAM), an oxide RAM, a conductive-bridging RAM (CBRAM), a phase-change memory (PCM), a magnetoresistive RAM (MRAM), a ferroelectric RAM (FERAM), a spin torque transfer MRAM (STT-MRAM) or a parallel and series combination of these.

9. The neural network processing system according to claim 8, wherein said at least one synapse consists of a plurality of memories, and said external weighted value of said at least one synapse consists of a plurality of bits.

\* \* \* \* \*